Feb. 11, 1964  C. SAURER  3,120,745
UNIVERSAL COUPLING
Filed July 10, 1961  2 Sheets-Sheet 1

INVENTOR.
CURT SAURER
BY
WILSON, SETTLE & CRAIG
ATTORNEYS

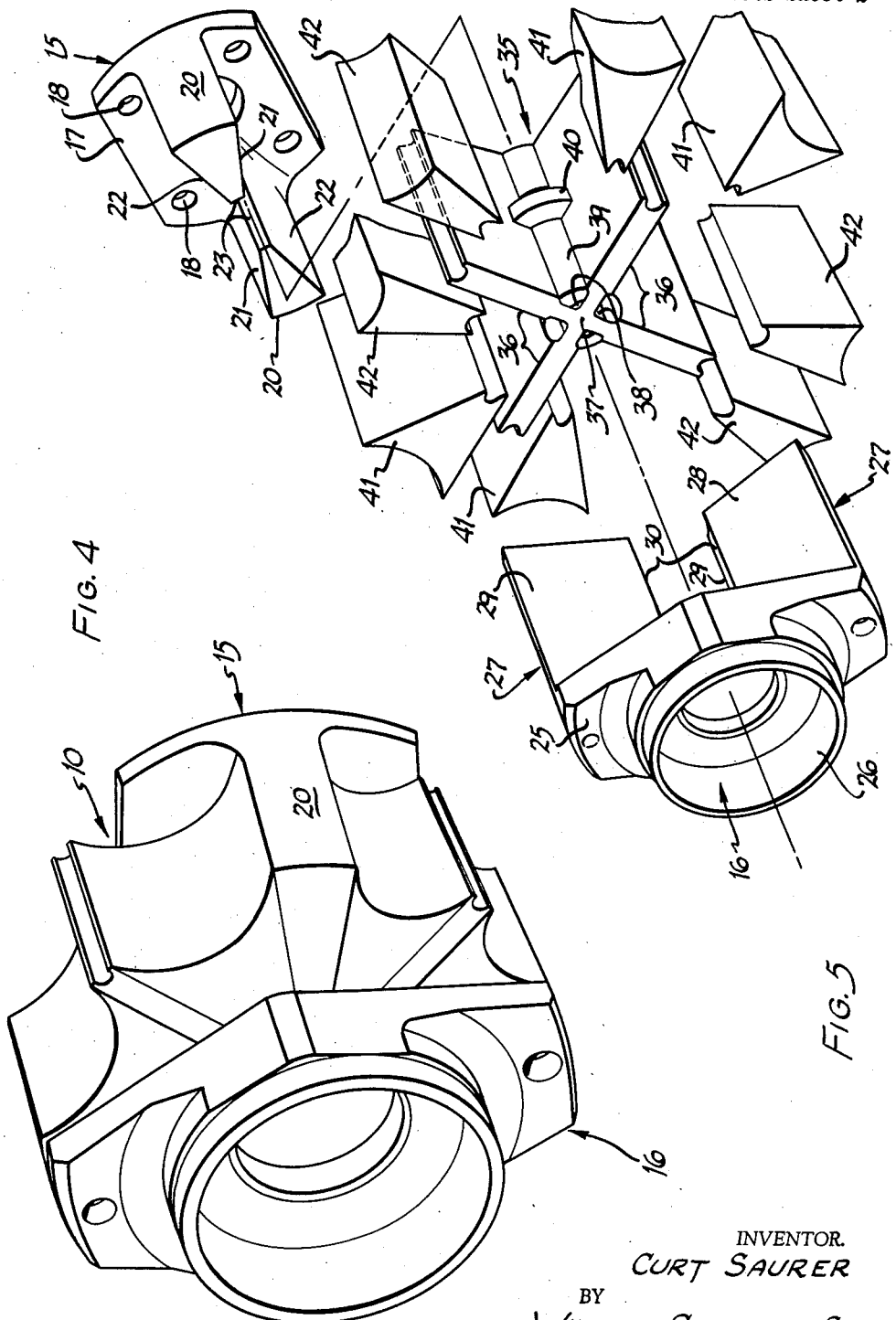

United States Patent Office 3,120,745
Patented Feb. 11, 1964

3,120,745
UNIVERSAL COUPLING
Curt Saurer, Oak Park, Mich., assignor to U.S. Universal Joints Company, Detroit, Mich., a corporation of Michigan
Filed July 10, 1961, Ser. No. 122,830
3 Claims. (Cl. 64—14)

The present invention relates to a joint for interconnecting driving and driven elements. More particularly, this invention relates to such a joint especially adaptable for automotive utilization, the joint being of differential torque capacity in its different driving directions, so that the size of the joint for a given torque capacity can be reduced without deleteriously affecting the accommodation of extreme angular deflection.

In a conventional universal joint for automotive applications, the driving and driven elements of the joint have interposed therebetween sector-shaped elastomeric blocks, these blocks accommodating angular deflection of the driving and driven members and also constituting a resiliently compressible driving medium between the driving and driven members. The resilient blocks are all of substantially the same volume and, therefore, compressively accommodate substantially the same torsional loads whether the vehicle is driven in a forward or a reverse direction. In order to accommodate the torsional loads imposed by present day vehicular engines, a given amount of resilient material must be provided, and the conventional joint must be of a given size in order to accommodate the compressive material.

The present invention now proposes a new and different approach to the design of universal joints for interconnecting driving and driven elements of an automotive drive train wherein the coupling is of differential torque capacity in its forward and reverse driving directions. This concept allows a material reduction in the size of the universal joint, with consequent savings in joint cost and with equally important savings in the space required in the vehicle for accommodating the drive line. Such space savings are particularly desirable in modern-day automotive vehicles to reduce the floorboard "hump" necessary in the passenger compartment to accommodate the transmission of power to the rear driving axle.

Generally, the present invention comprehends a universal joint, especially adapted for automotive vehicles but applicable under many varied circumstances, wherein the torque capacity of the joint is different in the two directions of rotation. Of course, in an automotive vehicle, the vehicle is driven in the forward direction substantially all of the time, driving in the reverse direction being substantially less, both in terms of duration and in terms of torque.

Not only is the device of the present invention of reduced overall size and of reduced cost, but the design more effectively utilizes the inherent capacity of the elastomeric material. For example, the sector-shaped elastomeric sections interposed between the lugs of the driving and driven elements of the coupling must be of a given size so that the resilient material is capable of tolerating, in compression, the load transmitted therethrough from a driving lug to a driven lug. That sector-shaped resilient portion interposed between the reverse face of the driving lug and the next adjacent driven lug is subjected to tension.

By utilization of relatively thin tensile sections in the present invention, the tensile sections are thin enough to give the full potential of the tensile strength of the material, and yet the sections are thick enough to avoid tensile stress to the point of rupture. Where elastomeric sections of the same volume are utilized, as in conventional joints, about two-thirds of the capacity of the tensile sections is lost. Further, by the utilization of relatively larger compression sections, the heat generation within the material is substantially reduced by reducing the unit shear load on flexing of the material due to misalignment of the driving and driven elements. Of course, the utilization of relatively larger volume compression elements yields a larger compression capacity for the same overall joint size.

By following the teachings of the present invention, it has been found possible to design a universal joint of four and three-quarter inches overall diameter capable of operating at a 12° constant misalignment angle of the driving and driven elements and capable of tolerating 30° momentary deflections at loads of up to 3500 foot pounds. Such operating capabilities cannot be obtained by conventional symmetric designs, but can be obtained by the asymmetric design of the present invention, wherein the differential in volume is such that from 53 to 67% of the total elastomeric material in the joint is located so as to be subject to compression upon driving of the vehicle in a forward direction.

It is, therefore, an important object of the present invention to provide an improved universal coupling for interconnecting driving and driven shafts, as in an automotive vehicle.

Another important object of the present invention is the provision of a universal joint of differential torque-transmitting capacity in its two driving directions, the torque capacity in the one direction of normal rotation being greater than the torque capacity in the reverse, seldom used direction.

It is a further object of the present invention to provide a universal joint capable of coupling together axially misaligned driving and driven elements of an automotive gear train, the drive being accomplished when the vehicle is operating in a forward direction through elastomeric compression members of substantially greater size than the complementary elastomeric tension members, so that substantially the full load capacity of the tension members is utilized at the same time that the relatively large compression elements operate at reduced unit shear loadings.

Yet another, and no less important, object of the present invention is the provision of a universal joint for utilization in a vehicular drive or the like to couple together axially misaligned driving and driven elements, the coupling including drive lugs rotatable with the elements, respectively, and elastomeric material interposed therebetween, the material interposed between the lugs through which the drive is transmitted in the one direction being of substantially greater volume than the material through which the drive is transmitted in a reverse direction, the difference in volume accommodating reduction of the overall coupling dimensions while increasing the driving efficiency of the coupling.

Other objects of this invention will appear in the following description and appended claims, reference being had to the accompanying drawings forming a part of this specification wherein like reference characters designate corresponding parts in the several views.

On the drawings:

FIGURE 4 is a perspective elevational view of the joint;

FIGURE 5 is an exploded perspective view similar to FIGURE 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
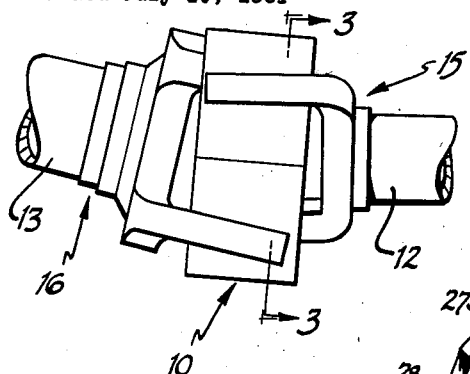
FIGURE 1 is a side elevational view of a universal joint on the present invention.
Figure 3:
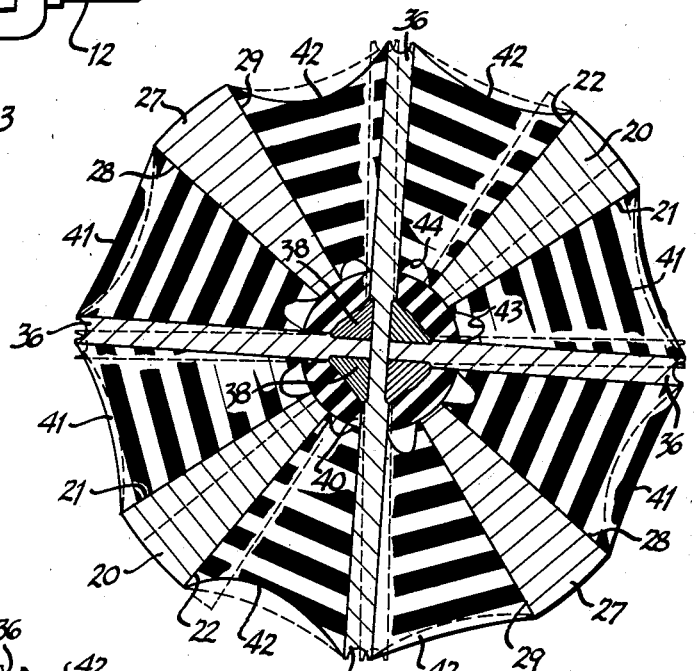
FIGURE 3 is a sectional view taken along the plane 3—3 of FIGURE 1, illustrating an adjusted driving position of the joint.

As shown on the drawings:

In FIGURE 1, reference numeral 10 refers generally to a universal joint of the present invention.

In FIGURE 1, it will be seen that the joint 10 is interposed between a driving element 12 and a driven element 13. The driving element 12, in an automotive application of the joint 10, may well be the output shaft of an automotive transmission, while the driven element 13 may well be the propeller shaft of the vehicle.

As best illustrated in FIGURES 4 and 5 of the drawings, the joint 10 includes torque elements 15 and 16 adapted to be coupled to the members 12 and 13, respectively. Assuming that the member 15 is the driving element, it will be seen that this member includes a rear plate 17 provided with mounting apertures 18 by which the member can be secured to the shaft 12. The member 17 is provided with integrally formed, or rigidly attached, driving lugs 20 projecting axially therefrom, such lugs being concentric with the axis of rotation of the shaft 12 and being wedge-shaped in cross sectional contour having inclined faces 21 and 22 lying substantially radial to the axis of the shaft 12 and joined by cylindrical inner faces 23 concentric with the axis of the shaft 12.

The driven element 16 comprises a drive plate 25 provided with a cylindrical embossment 26 for drivingly receiving the end of the driven shaft 13, the plate 25 being provided with projecting lugs 27 of substantially the same size and contour as the lugs 20 heretofore described for the plate 17 and having radial faces 28 and 29 joined by inner arcuate surfaces 30 concentric with the surfaces 23.

A central spider 35 of cruciform cross-sectional contour has its radial arms 36 interposed between adjacent lugs 20 and 27. The arms 36 of the spider 35 radiate from a central hub 37, the arms 36 being joined at the hub by welds 38. These welds 38 are covered by quadrant-shaped blocks 39 adhered thereto and preferably formed of a suitable elastomeric material, as to be hereinafter more fully described. The elastomeric quadrants 39 extend the full axial length of the spider 35, the axial length of the spider 35 being substantially the same, but slightly greater than, the axial length of the lugs 20 and 27. Medially of the length of the quadrants 39, there is located a radially enlarged, cylindrical guide surface 40 adapted to be contacted by the inner arcuate surfaces 23 and 30 of the lugs 20 and 27, respectively, the surfaces 23 and 30 being concentric with and arcuately conforming to the surface 40.

Interposed between the lugs 20 and 27 and the arms 36 of the spider 35 are segmental elastomeric blocks 41 and 42. It will be noted that the blocks 41 are substantially larger than the blocks 42, for a purpose to be hereinafter more fully described.

Actually, during the manufacture of the coupling 10, the elastomeric blocks 41 and 42 are in situ molded between the lugs 20 and 27 and the arms 36 of the spider 35. Prior to the molding of the blocks 41 and 42 the cylindrical fillets or segments 39 are in place with the surfaces 40 being utilized to locate the lugs 20 and 27 relative to the central spider 35. If desired, the surfaces 21 and 22 of the lugs 20 and the surfaces 28 and 29 of the lugs 27 and the side surfaces of the spider arms 36 may be coated with a suitable adhesive to insure adequate adhesion of the elastomeric material thereto. Additionally, a peripheral mold appropriately contoured encloses and locates the spider 35 and the lugs 20 and 27 peripherally, while appropriate mold inserts are provided to form recesses 43 and 44 in the blocks 41 and 42, respectively, adjacent the exterior periphery 40 of the spider 35.

By thus "potting" or in situ molding the elastomeric material, the blocks 41 and 42 are formed and the blocks are formed as separate units capable of individual deflection to accommodate axial misalignment of the driving and driven members 12 and 13, respectively, as illustrated in FIGURE 1 of the drawings. The spider 35 is provided to subdivide the spaces intermediate the lugs 20 and 27. Such subdivision of the spaces and the free floating support of the spider by only the elastomeric material allows the spider to "split" the misalignment of the shafts so that any one block 41—42 is torsionally distorted due to the misalignment through a lesser degree than would be possible without the spider. Further, the spider stabilizes the elastomeric material constituting the blocks by splitting the material into two individual blocks of greater dimensional stability and subjected to less compression or tension than would be the case if the spider were not present.

Figure 2:
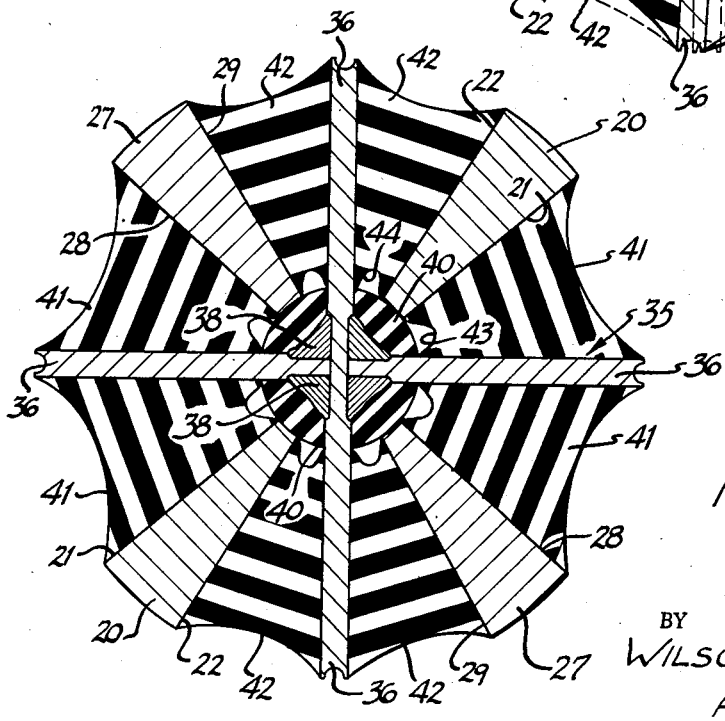
FIGURE 2 is a sectional view similar to that taken along the plane 3—3 of FIGURE 1, but illustrating the joint in a relaxed condition.

As best shown in FIGURE 2 of the drawings, the coupling 10 is primarily adapted to be driven in a clockwise direction. Assuming that the coupling is utilized in an automotive vehicular drive, forward movement of the vehicle will displace the coupling 10 in a clockwise direction. Thus, the face 21 of the lug 20 of the driving member becomes the driving face through which torque in the shaft 12 is transmitted through the blocks 41 to the face 28 of the driven lug 27 of the plate 25. Thus, in normal operation of the automobile in a forward direction, the blocks 41 are subjected to compression. The blocks 42 are bonded to the trailing faces 22 of the lugs 20 and to a different arm 36 of the spider 35, the next adjacent block 42 being bonded to the different spider arm 36 and to the face 29 of the trailing driven lug 27.

Due to the elastomeric nature of the blocks 41 and 42, during such driving in a clockwise or forward direction, the block 41 will be compressed by the, in effect, shifting of the face 21 in the clockwise direction to compress the block 41 interposed between the face 21 and the adjacent side surface of the spider 36. The block 41 interposed between the other side face of the spider leg 36 and the face 28 will also be compressed to the same degree. As a result, there is a definite clockwise angular shifting of the lugs 20 relative to the lugs 27 and there is a clockwise shifting of the spider 35 to an extent equal to one-half the total shift of the driving lugs 20.

This clockwise shift of the lugs 20 and the spider 35 will, of course, subject the blocks 42 to tension, the blocks 42 being attenuated and placed under a tensile force. In a properly designed coupling as illustrated in FIGURE 2 of the drawings, there will be a total driving effort exerted on the driven lugs 27 which is the sum of the compression (pushing) force applied thereto through the blocks 41 and the tensile (pulling) force exerted thereon by the blocks 42.

In order to obtain an effective tensile force, the thickness of the blocks 42 must be sufficient to avoid tensile stress to the point of rupture at any point within the blocks, but, equally importantly, the blocks 42 must be sufficiently thin in section to give the full potential tensile strength to the overall composite driving force. If the tensile blocks 42 were of the same size as the compression blocks 41, two-thirds of the force-transmitting capacity of the tensile blocks 42 is lost. At the same time, the relatively larger compression blocks 41 give a large compression capacity, since the greater amount of material is capable of transmitting greater compression loads. Simultaneously, the greater amount of material reduces heat generation therein by reducing the unit shear load imposed upon the material due to the axial misalignment of the driving and driven members 12 and 13.

Of course, during rotation of the coupling in a counter-clockwise direction, the torque capacity of the coupling is substantially smaller than is its capacity in a clockwise direction, because of the two-fold effect of the decreased size of the blocks 42 (which now become the compression blocks) and the increased size of the blocks 41 (which now become the tensile blocks). However, in operation of the normal automotive vehicle, the vast majority of vehicle operating time takes place in a single direction, namely forwardly. Not only is operation in the reverse direction limited in occurrence, it is limited in duration and, even more importantly, it is limited in rotational speed of the driving and driven members and in the torque output of the engine operating far below its maximum power generation speeds.

Thus, the present invention proposes a new and novel universal joint specifically adapted for automotive vehicle utilization. The differential in size between those elastomeric members subjected to compression and subjected to tension upon forward operation of the vehicle makes possible the design of a relatively small unit capable of extremely high loads and capable of tolerating substantial axial misalignments. As exemplary of joints manufactured in accordance with the present invention, a joint having an overall diameter of four and three-quarters inches can operate at a constant angular deflection of 12° and tolerate momentary angular deflections of as great as 30° at loads of up to 1500 foot pounds where the elastomeric material is rubber and of up to 3500 foot pounds where the elastomeric material is polyurethane.

Having thus described my invention, I claim:

1. In a universal resilient coupling for an automotive vehicle and adapted to connect a transmission output shaft to an axle input shaft for normal rotation in a first direction effective to drive the vehicle in a forward direction and also rotatable in a second direction effective to drive the vehicle in a reverse direction; a driving flange for connection to the output shaft and a driven flange for connection to said input shaft, each such flange having a pair of diametrically opposed radial wedges projecting therefrom, said wedges each having leading and trailing substantially radial faces when the vehicle is driven in said forward direction, a separator having four equally spaced spokes radiating from the central portion thereof and interposed between the radial faces of said wedges, respectively, centering means on said separator contacting each of said wedges, a resilient member interposed between and bonded to the radial faces of each of said radial wedges and to the separator spokes, those resilient members bonded to one set of diametrically opposed separator spokes and interposed between the leading faces of said driving wedges and the trailing faces of said driven wedges being subjected predominantly to compression forces when the vehicle is driven in said forward direction and constituting from 53 to 67% of the total volume of resilient material in said coupling, and the remainder of the resilient material being subjected predominantly to tensile forces when the vehicle is driven in said forward direction.

2. In a drive coupling for interconnecting driving and driven elements which are axially misaligned and which are predominantly driven in one rotational direction while accommodating driving thereof in the opposite rotational direction; the improvements of substantially identical radially overlapping peripherally spaced segmental lugs on the driving and driven elements, respectively; and separate blocks of resilient material interposed between adjacent lugs, respectively, and bonded to each radial face of each lug to completely fill the spaces between the lugs; each of the lugs of the driving member being spaced further peripherally from the next adjacent lug of the driven member in the one rotational direction than the lug of the driving member is spaced from the next adjacent lug of the driven member in the opposite direction, the blocks being of sizes corresponding to the lug spacings, so that upon rotation in one direction the larger blocks are subjected to predominantly compression forces exerted from the driving element lugs to the driven element lugs and the smaller lugs are subjected to predominantly tensile forces pulling the driven lugs from the driving lugs, and upon rotation in the opposite direction the smaller blocks are subjected to predominantly compression forces and the larger blocks are subjected to predominantly tensile forces.

3. In a universal resilient coupling for connecting a vehicular driving shaft to a driven shaft for rotation in a first direction to drive the vehicle forwardly and in a second direction to drive the vehicle reversely; a pair of diametrically opposed radial wedge shaped lugs on said shafts, respectively, said lugs being asymmetrically disposed about the rotational axis of said coupling, the leading faces of the driving shaft lugs when the shaft rotates in the first direction being spaced from the trailing faces of the driven shaft lugs through a distance substantially greater than the space between the trailing faces of the driving shaft lugs and the leading faces of the driven shaft lugs; a separator having four symmetrically spaced spokes interposed between said lugs; and a resilient material investing the lugs and the interposed separator spokes, said resilient material accommodating angular deflection of the shafts and radial shifting of the lugs relative to one another, the asymmetric spacing of the lugs resulting in the presence of a larger volume of material to be subjected to compression upon driving of the vehicle forwardly and the presence of less material to be subjected to tension only, from 53 to 67% of the total amount of the material being subjected to compression.

References Cited in the file of this patent

UNITED STATES PATENTS

| | | |
|---|---|---|
| 2,127,942 | Schmidt | Aug. 23, 1938 |
| 2,213,277 | Guy | Sept. 3, 1940 |
| 2,417,436 | Natkins | Mar. 18, 1947 |
| 2,629,991 | Guy | Mar. 3, 1953 |
| 2,876,635 | Saurer | Mar. 10, 1959 |

FOREIGN PATENTS

| | | |
|---|---|---|
| 183,014 | Great Britain | July 20, 1922 |